United States Patent [19]

Pruett et al.

[11] Patent Number: 5,215,876
[45] Date of Patent: Jun. 1, 1993

[54] RADIOGRAPHIC ELEMENT WITH UV ABSORBATION COMPOUND IN POLYESTER SUPPORT

[75] Inventors: Wayne P. Pruett; Max A. Weaver, both of Kingsport, Tenn.; Elizabeth K. Priebe, Rochester, N.Y.; Larry K. Maier, Rochester, N.Y.; Robert E. Dickerson, Rochester, N.Y.

[73] Assignee: Eastman Kodak Company, Rochester, N.Y.

[21] Appl. No.: 751,846

[22] Filed: Aug. 29, 1991

[51] Int. Cl.$^5$ ............................................. G03C 1/815
[52] U.S. Cl. ................................... 430/512; 430/533; 430/931
[58] Field of Search ............... 430/533, 534, 535, 510, 430/512, 517, 931

[56] References Cited

U.S. PATENT DOCUMENTS

| | | | |
|---|---|---|---|
| 3,822,131 | 7/1974 | Cleare | 96/82 |
| 3,849,658 | 11/1974 | Jeurisson et al. | 250/486 |
| 4,617,374 | 10/1974 | Pruett et al. | 528/288 |
| 4,707,537 | 11/1987 | Pruett et al. | 528/288 |
| 4,749,773 | 6/1988 | Weaver et al. | 528/288 |
| 4,749,774 | 6/1988 | Weaver et al. | 528/288 |
| 4,845,187 | 7/1989 | Weaver et al. | 528/288 |
| 4,994,512 | 2/1991 | Weaver et al. | 524/209 |

OTHER PUBLICATIONS

Research Disclosure, vol. 184, Aug. 1979, Item 18431, published by Kenneth Mason Publications, Ltd., pp. 433–440.
Research Disclosure, vol. 248, Dec. 1984, Item 24822, published by Kenneth Mason Publications, Ltd., p. 598.

Primary Examiner—Jack P. Brammer
Attorney, Agent, or Firm—L. George Legg

[57] ABSTRACT

A radiographic element comprises a polyester support having double sided silver halide emulsion layers. An ultraviolet light absorbing methine compound is copolymerized with the support and is present in an amount sufficient to reduce the average percent transmission of ultraviolet light over the range of wavelength of from about 350 nm to about 395 nm to less than about 25 percent, and whereby the percent transmittance of said element is at least about 55 percent at a wavelength of about 410 nm for an element thickness of about 0.007 inches.

7 Claims, 6 Drawing Sheets

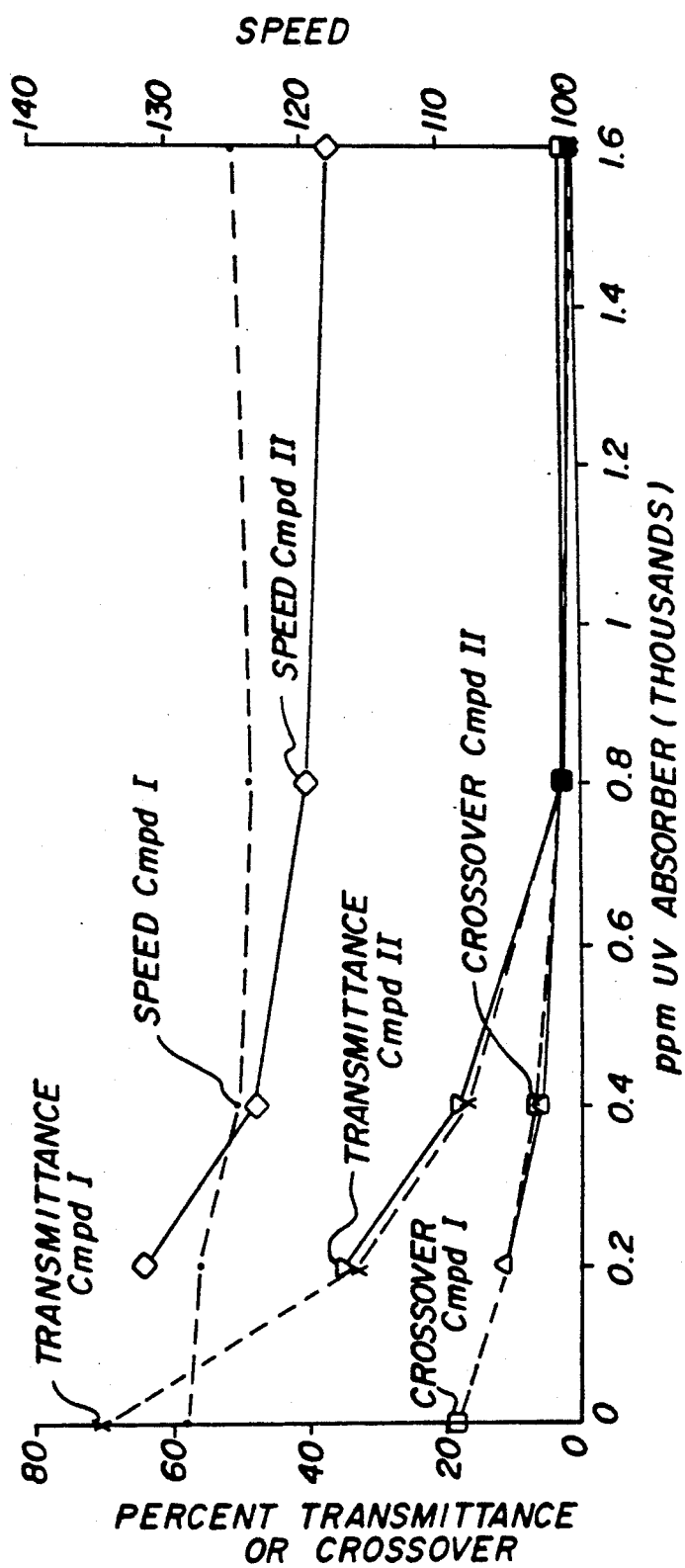

RADIOGRAPHIC ELEMENT WITH UV ABSORBATION COMPOUND IN POLYESTER SUPPORT

FIELD OF THE INVENTION

This invention relates to double coated silver halide radiographic elements of the type employed in combination with intensifying screens. More specifically, the invention relates to a radiographic element having a polyester support copolymerized with an ultraviolet light-absorbing compound.

RELATED COMMONLY ASSIGNED FILINGS

This application is related to commonly assigned applications U.S. Ser. No. 07/751,905 filed Aug. 29, 1991, titled RADIOGRAPHIC ELEMENT.

BACKGROUND OF THE INVENTION

Photographic elements relying on silver halide emulsions for image recording are employed in radiographic assemblies. It is known that silver halide emulsions are more responsive to light than to X rays. Accordingly, intensifying screens are used in radiographic assemblies. An intensifying screen contains a phosphor which absorbs X radiation and emits radiation in the visible spectrum or in an adjacent spectral region, ultraviolet or infrared.

It is also desirable to limit patient exposure to high levels of X radiation. Dual coated radiographic assemblies are used to allow reduced levels of X radiation to obtain a useful radiograph. Accordingly, radiographic assemblies can comprise a dual coated light sensitive radiographic element disposed between a pair of fluorescent intensifying screens. The intensifying screens, upon exposure to X radiation, emit radiation in the visible spectrum or in an adjacent spectral region, e.g. ultraviolet or infrared that exposes the silver halide emulsions and results in a recorded image in both emulsion layers.

An image sharpness limitation of dual coated radiographic elements results from a phenomenon known as "corssover". Crossover occurs when light emitted by each intensifying screen passes through the film support, exposing and giving rise to an unsharp image in the oppositely situated silver halide emulsion layer.

A variety of techniques have been tried to reduce crossover. One approach is to dissolve a filter in one or more of the hydrophilic colloid layers or in the support forming the radiographic element. Accordingly, in an ultraviolet light-sensitive radiographic element, an ultraviolet light absorbing compound can be situated between the emulsion layers to reduce crossover of ultraviolet radiation. A desirable characteristic of the ultraviolet light absorbing compound is that it exhibit minimal absorption of light at wavelengths above about 400 nm so that the amount of yellow hue in the radiographic element is thus minimized.

Another approach to improve the clarity of the exposed image by decreasing undesirable yellow hue in a radiographic element is to add a blue dye to the support to offset the yellow, thereby improving the contrast of the exposed image. This approach, however, does not sufficiently offset the yellow hue, and further improvement in decreasing the yellow hue to achieve a sharp image is desirable.

Another prior art approach employs T-Grain® emulsions to achieve reduction in crossover without employing dyes and ultraviolet light absorbers as above. It is desirable, however, to continue to provide an alternative to radiographic elements employing T-Grain ultraviolet light-sensitive emulsions. There is therefore still a need for improved ultraviolet light absorbing compounds for use in non T-Grain, ultraviolet light-sensitive, radiographic elements.

The present invention solves the prior art problems noted above. It provides ultraviolet-light absorption capability sufficient to substantially reduce crossover of ultraviolet radiation to the opposite ultraviolet-sensitive emulsion layer. It achieves a desired level of ultraviolet-light absorption without imparting an undesirable yellow hue to the photographic element. Thus, by means of this invention there is provided a radiographic element that upon exposure to X radiation provides a recorded image substantially free of crossover. The invention thereby provides an exposed image that is sharper and more readable.

RELATED ART

U.S. Pat. No. 3,822,131 discloses a double-sided radiographic image-recording element having an ultraviolet absorbing material between the silver halide emulsion layers to reduce crossover. The reference also discloses incorporating the ultraviolet absorbing material in the base in the range from about 50 to about 2000 parts per million and that the absorbers are most effective at wavelengths of about 410 nm or less. The compounds of this patent are expensive and difficult to prepare. Furthermore, when added to the radiographic element in adequate levels to achieve maximum desired level of crossover they impart an unwanted yellow color.

U.S. Pat. No. 3,849,658 discloses a radiographic image-recording element having an ultraviolet absorbing substance between the emulsion layers to reduce crossover. The ultraviolet substance is incorporated in the support in a range from about 50 to about 2000 parts per million or in a subbing layer in a range from about 25 to about 1000 parts per million. Additionally, they contribute significant yellow color to the radiographic element when added at levels needed to achieve the maximum desired crossover reduction.

U.S. Pat. Nos. 4.617,374, 4,707,537, 4,749,773, 4,749,774, 4,845,187, and 4,994,512 disclose ultraviolet light-absorbing compounds copolymerized with polyester and polycarbonate compounds suitable for use as beverage bottles and the like. The patents do not describe the use of the compounds in radiographic elements and in the useful loadings provided by our invention.

Some of the preferred uv absorbers employed in this invention are within the disclosure of the above-identified references. however, the references do not describe the use of such compounds in X ray films. Furthermore, the references do not disclose the unexpected light-absorbing activity of such compounds in X ray film (set forth in the experimental section of this specification).

*Research Disclosure*, Vol. 184, August 1979, Item 18431, summarizes the state of the art of constructing radiographic elements, including dual coated radiographic elements employing light-absorbing dyes to reduce crossover. *Research Disclosre* is published by Kenneth Mason Publications, Ltd., Emsworth, Hampshire P0107DD, England.

Research Disclosure, Vol. 248, December 1984, Item 24822, discloses a variety of structures useful as UV absorbing compounds to reduce crossover in radiographic film, including benzophenones, benzotriazoles, benzylidene malonates, salicylates, oxamides, etc. The reference, however, does not disclose the compounds of our invention. Furthermore, when compounds of this reference are used at an adequate level to reduce crossover to achieve maximum image sharpness, excessive amounts are required and/or the UV absorber imparts an objectionable yellow color.

The structural formulas for the compounds in FIGS. 3-6 are as given in the FIGS. The curves were obtained using a methylene chloride solution in which the concentration of the compounds was about 0.1 g/l.

Figure 7:
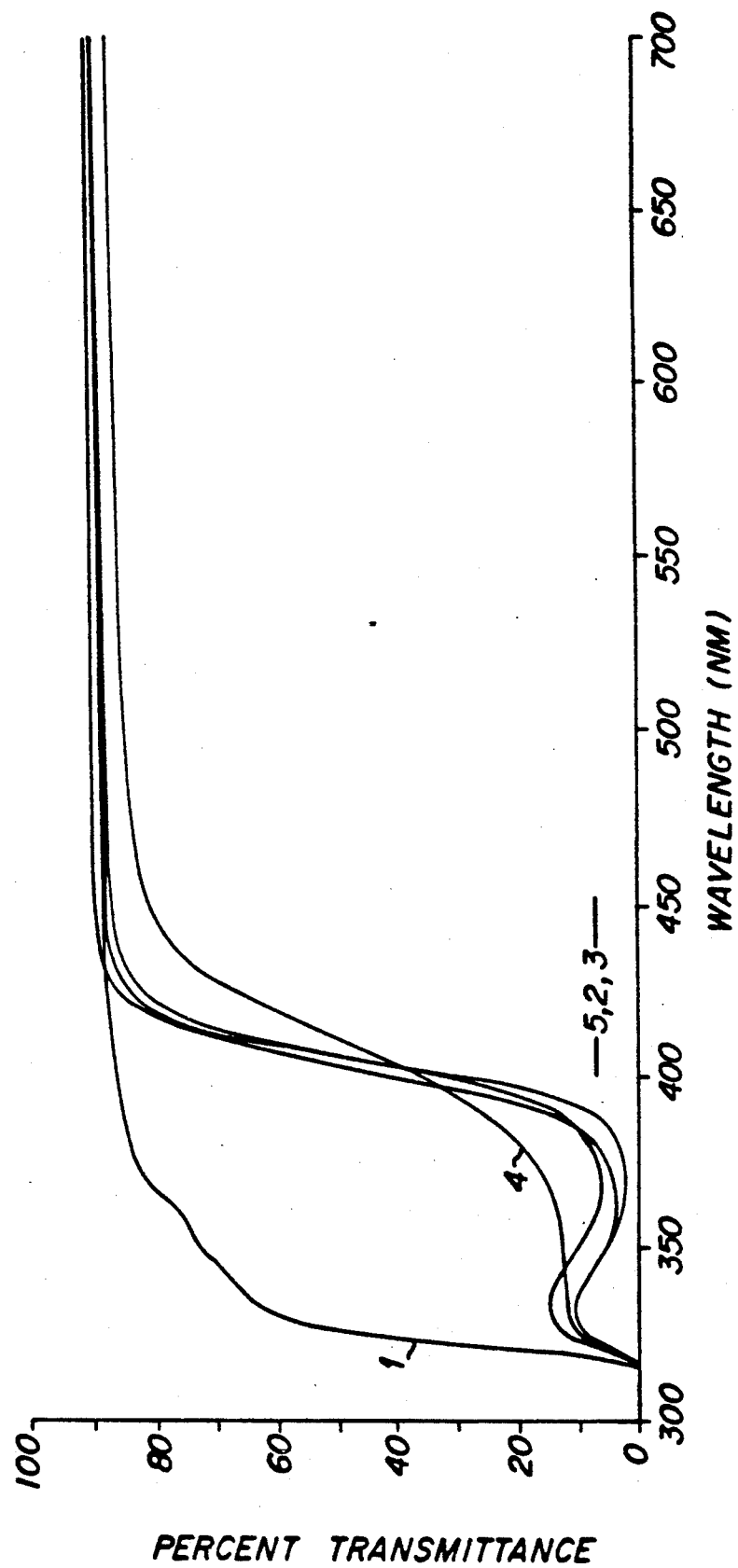

FIG. 7 is a graph of transmittance versus spectral wavelength for test runs of poly (ethylene terephthalate) (PET) film containing specified uv absorbers and for a control without uv absorber.

Figure 8:
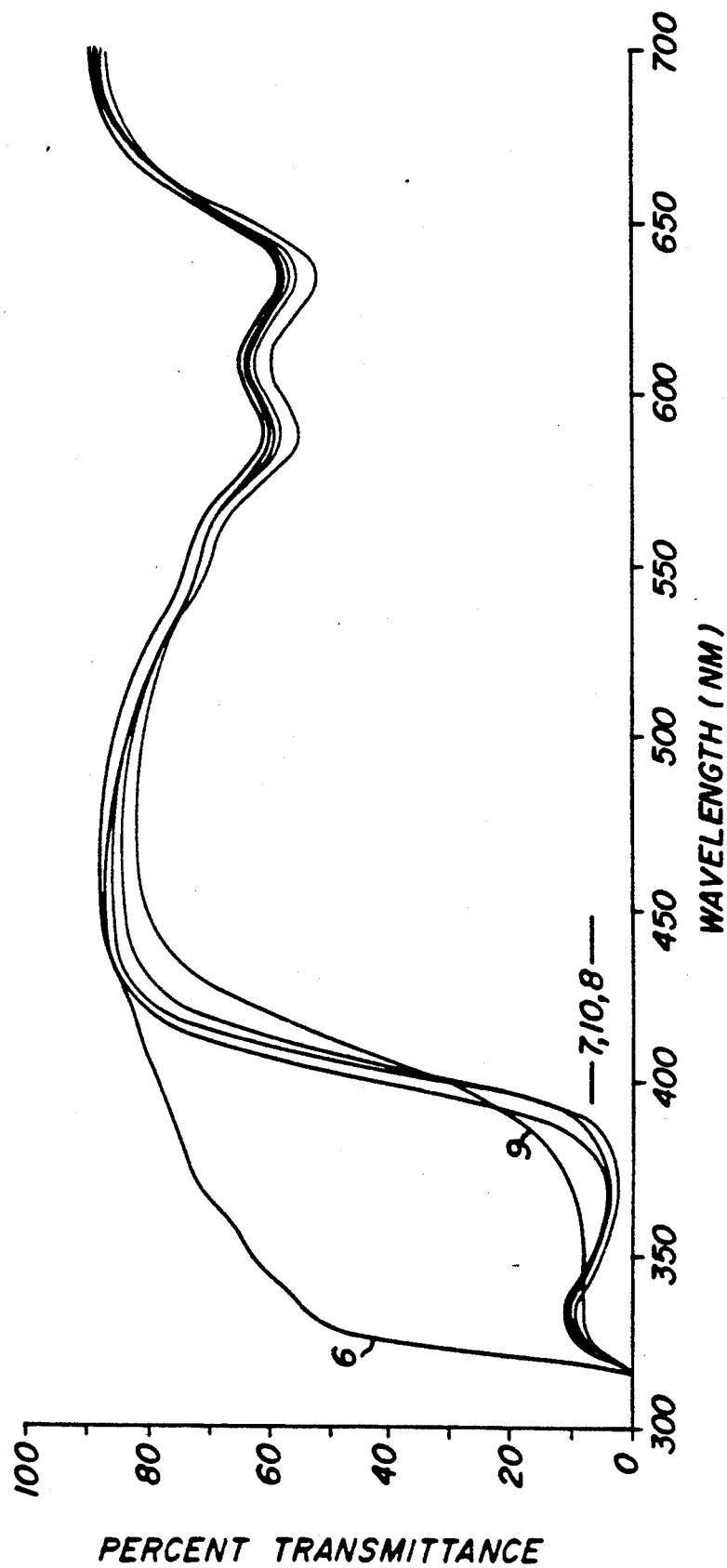

FIG. 8 is a graph of percent transmittance versus spectral wavelength for test runs of PET film containing blue dye and specified uv absorbers and for a control without uv absorber.

FIG. 9 is a graph showing film speed, percent corssover, and percent transmittance for PET film containing uv absorber used in the invention.

SUMMARY OF THE INVENTION

This invention comprises a radiographic element comprising a polyester support having opposed major surfaces and having an ultraviolet light-sensitive silver halide emulsion layer on each such surface. Copolymerized with the polyester in the support is an ultraviolet light-absorbing methine compound.

The methine compound is present in an amount sufficient to reduce the average percent transmission of ultraviolet light over the range of wavelength of from about 350 nm to about 395 nm to less than about 25 percent, and whereby the percent transmittance of the element is at least about 55 percent at a wavelength of about 410 nm for an element thickness of about 0.007 inches. In another embodiment, the methine compound is present in an amount sufficient to reduce the average percent transmission of ultraviolet light in the stated range to less than about 12 percent. Improved sharpness of the image recorded in each silver halide emulsion layer thus results.

In accordance with the present invention, certain ultraviolet light absorbing methine compounds defined below are reacted with the condensation polymer and impart thereto the property of ultraviolet light absorption in the spectral wavelength range of about 400 nm. and below. The ultraviolet light absorbing methine compounds are thermally stable at polymer processing conditions, including polycondensation temperature of up to about 300° C. In one embodiment, the weight proportion of the ultraviolet light absorbing methine compound to the polyester is in the range of from about 200 to about 1600 ppm. In another embodiment, the weight proportion of the ultraviolet light absorbing methine compound to the polyester is in the range of from about 400 to about 800 ppm.

DESCRIPTION OF PREFERRED EMBODIMENTS

In a preferred embodiments, this invention comprises a radiographic image-recording element, comprising:

a polyester support having opposed major surfaces;

an ultraviolet light-sensitive silver halide emulsion layer on each of such surfaces; and copolymerized with the polyester at least one ultraviolet light absorbing compound.

The ultraviolet light absorbing compound has the formula:

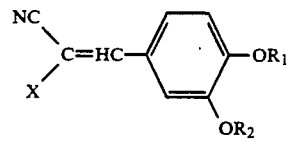

wherein:

$R_1$ and $R_2$ are independently selected from the grop consisting of:

alkyl groups having from 1 to about 20 carbon atoms, cycloalkyl groups having from about 3 to about 7 carbon atoms, and aryl groups having from 6 to about 12 carbon atoms, all of which may be substituted;

alkenyl groups having from about 3 to about 10 carbon atoms;

alkynyl groups having from about 3 to about 10 carbon atoms;

hydrogen;

groups of the formula:

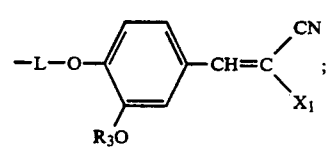

and groups of the formula:

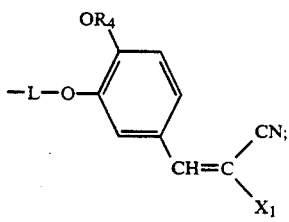

wherein L is an organic divalent linking group;

$R_3$ and $R_4$ are selected from the group consisting of:

alkyl groups having from 1 to about 20 carbon atoms, cycloalkyl groups having from about 3 to about 7 carbon atoms, and aryl groups having from 6 to about 12 carbon atoms, all of which may be substituted;

alkenyl groups having from about 3 to about 10 carbon atoms;

alkynyl groups having from about 3 to about 10 carbon atoms; and hydrogen;

X and $X_1$ are independently selected from $—CON(R_5)R_6$ and $—SO_2R_6$, wherein:

$R_5$ is hydrogen or an alkyl group having from 1 to about 20 carbon atoms;

$R_6$ is an alkyl group having from 1 to about 20 carbon atoms, a cycloalkyl group having from about 3 to about 7 carbon atoms, or an aryl group having from 6 to about 12 carbon atoms, all of which may be substituted; an alkenyl group having from about 3 to about 7 carbon atoms; an alkynyl group having from about 3 to about 10 carbon atoms; hydrogen; or a group having the formula

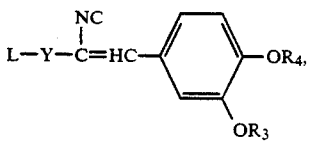

wherein Y is $—CO_2—$, $—CON(R_5)—$ where $R_5$ is as defined above, or $—SO_2—$, and L, $R_3$, and $R_4$ are as defined above;

provided that the ultraviolet light absorbing compound bears at least one substiuent that is reactive with one of the monomers from which the polyester is derived; and wherein the ultraviolet light absorbing compound is present in an amount sufficient to reduce the average percent transmission of ultraviolet light over the range of wavelength of from about 350 nm to about 395 nm to less than about 25 percent, and whereby the percent transmittance of the element is at least about 55 percent at a wavelength of about 410 nm for an element thickness of about 0.007 inches. In another embodiment, the ultraviolet light absorbing compound can be employed in an amount sufficient to reduce the average percent transmission of ultraviolet light in such range to less than about 12 percent.

As used herein, the term "substituted alkyl" means $C_1$-$C_{20}$ alkyl group substituted by one or more of halogen, phenyl, $C_3$-$C_7$ cycloalkyl, $C_1$-$C_4$ alkoxy, $C_1$-$C_4$ alkanoyloxy, $C_1$-$C_4$ alkoxycarbonyl, hydroxy, amino, carboxy, $C_1$-$C_4$ alkylsulfonyl, $C_1$-$C_4$ alkylthio, phenoxy, phenylthio, cyano, succinimido, carbamoyl, sulfamoyl, $C_1$-$C_4$ alkoxycarbonyl and furyl. The term "substituted cycloalkyl" means $C_3$-$C_7$ cycloalkyl groups substituted by one or more of $C_1$-$C_4$ alkyl, $C_1$-$C_4$ alkoxy, halogen, hydroxy, $C_1$-$C_4$ alkoxycarbonyl and the like. The term "substituted aryl" means aryl groups containing 6 to about 12 carbons substituted with the substituents which may be present on the substituted alkyl groups described above. The term "$C_1$-$C_4$ alkanoyloxy" means a $C_1$-$C_4$ alkyl group bonded to a carbonyl function which is bonded to another oxygen. For example, $C_2$ alkanoyloxy is propionyloxy. The term "$C_1$-$C_4$ alkoxycarbonyl" means $C_1$-$C_4$ alkoxy bonded to a carbonyl function, e.g., the $C_2$ alkoxycarbonyl group is ethoxycarbonyl. The meaning of "reduce the average percent transmission of ultraviolet light over the range of wavelength of from about 350 nm to about 395 nm to less than about [X] percent", as is made clear from its context and from the below Examples, the description thereof, and the accompanying Figures, is that the transmission of ultraviolet light through the dual coated radiographic element of the invention when averaged over the stated range is less than the stated value of X.

The meaning of "whereby the percent transmittance of the element is at least about 55 percent at a wavelength of about 410 nm for an element thickness of about 0.007 inches" is readily understood by one skilled in the art. The term does not limit the thickness of the element of the invention but rather defines a characteristic of the radiographic element, that is, other thickness elements are also within the scope of the invention. The transmittance of an element will vary according to its thickness. The transmittance should vary in an approximately linear manner for element thicknesses employed in the radiographic art. Thus, an element of the invention having a thickness of about 0.007 inches (0.18 mm) will transmit at least about 55 percent of the light of wavelength of about 410 nm. An element of the invention thicker than such should have less transmittance, and a thinner element more transmittance, than about 55 percent at about 410 nm.

As stated hereinabove, the UV absorbing compounds must bear or contain at least one substituent that is reactive with one of the monomers from which the condensation polymer is derived. Examples of such reactive substituents include carbonyl halides such as carbonyl chloride, carboxy, alkoxycarbonyl, alkenyloxycarbonyl, cycloalkoxycarbonyl, aryloxycarbonyl, amino, hydroxy, esterified hydroxy, i.e., acyloxy, groups such as carboxylic acid esters, e.g., alkanoyloxy, cycloalkanoyloxy and aroyloxy, carbamic acid esters, esters, e.g., N-alkylcarbamoyloxy and N-arylcarbamoyloxy and carbonate esters, e.g., ethoxycarbonyloxy. Thus, for example, in the above formula when $X$, or X and $X_1$, are not an ester but an amide or sulfone, then $—OR_1$ and/or $—OR_2$ must have a reactive group, e.g. $—OH$. The preparation of such copolymers useful in the invention is described in U.S. Pat. No. 4,749,774, incorporated by reference as if fully set forth herein.

Preferred uv absorbers are those of the above formula wherein $R_1$, $R_2$, $R_3$ and $R_4$ are independently selected from hydrogen; cycloalkyl; cycloalkyl substituted with one or two of alkyl, alkoxy or halogen; phenyl; phenyl substituted with 1-3 of alkyl, alkoxy, halogen, alkanoylamino, or cyano; straight or branched lower alkenyl; straight or branched alkyl and such alkyl substituted with 1–3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinylsulfonyl; acrylamido; sulfamyl; benzoylsulfonicimido; alkylsulfonamido; phenylsulfonamido; alkenylcarbonylamino; groups of the formula

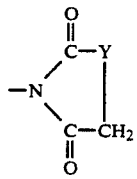

wherein y is —NH—,

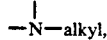

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

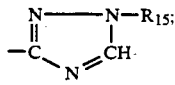

—NHX$_3$R$_{16}$; —CONR$_{15}$R$_{15}$; and —SO$_2$NR$_{15}$R$_{15}$; wherein R$_{15}$ is selected form H, aryl, alkyl, and alkyl substituted with halogen, phenoxy, aryl, —CN, cycloalkyl, alkylsulfonyl, alkylthio, or alkoxy; X$_3$ is —CO—, —COO—, or —SO$_2$—; R$_{16}$ is selected from alkyl and alkyl substituted with halogen, phenoxy, aryl, cyano, cycloalkyl, alkylsulfonyl, alkylthio, and alkoxy; and when X$_3$ is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1–3 of alkyl, alkoxy, or halogen.

Preferably, X and X$_1$ are independently selected from cyano, carbamyl, N-alkylcarbamyl, N-alkyl-N-arylcarbamyl, N,N-dialkylcarbamyl, N,N-alkylarylcarbamyl, N-arylcarbamyl, N-cyclohexylcarbamyl, aryl, 2-benzoxazolyl, 2-benzothiazolyl, 2-benzimidazolyl, 1,3,4-thidiazol-2-yl, 1,3,4-oxadiazol-2-yl, alkylsulfonyl, arylsulfonyl or acyl.

The organic linking represented by L is bonded to the adjacent oxygen atoms through non-oxo carbon atoms, e.g., unsubstituted or substituted methylene groups, a methylidene group and an unsubstituted methylene group or a nuclear carbon atom of a carboxyclic or heterocyclic aromatic group. Thus, linking group L is selected from a wide variety of alkylene, alkenylene, alkynylene, cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene, or divalent aromatic heterocyclic groups. Examples of alkylene linking groups containing a cyclic moiety in the linking chain include:

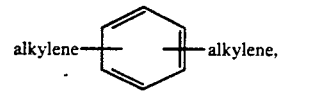

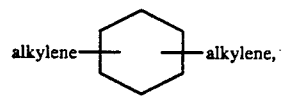

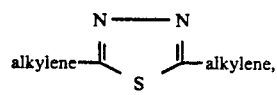

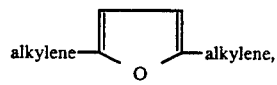

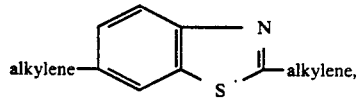

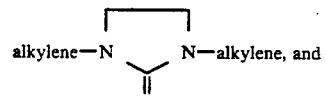

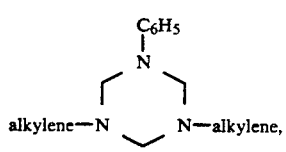

The carbocylic arylene groups may be cycloalkylene such as 1,2—, 1,3— and 1,4-cyclohexylene, 1,2— and 1,4-phenylene and 2,6— and 2,7-naphthylene.

Examples of the divalent heterocyclic groups include unsubstituted and substituted triazines such as 1,3,5-triazin-2,4-diyl, 6-methoxy—1,3,5-triazin-2,4-diyl and the group having the structure:

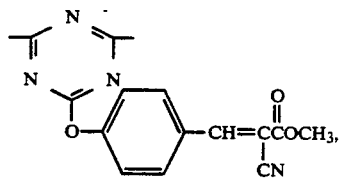

diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-pyridazindiyl; dicyanopyridines such as 3,5-dicyano-2,6-pyridindiyl and 4-phenyl-3,5-cyano-2,6-pyridindiyl; quinolines and isoquinolines such as 2,4-quinolindiyl and 2,8-isoquinolinediyl; quinoxalines such as 2,3-quinoxalindiyl; and azoles such as 2,5-thiazoldiyl, 5-methylene-2-thiazolyl, 3,5-isothiazoldiyl, 5-methylene-3-isothiazolyl, 1,3,4-thiadiazol-2,5-diyl, 1,2,4-thiadiazol-3,5-diyl, 2,6-benzothiazoldiyl, 2,5-benzoxazoldiyl, 2,6-benzimidazoldiyl, 6-methylene-2-benzothiazolyl and the group having the structure:

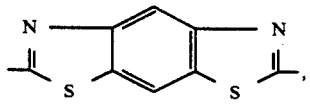

and maleimides such as 1-methyl-3,4-maleimidediyl and 1-phenyl-3,4-maleimidediyl. The acyclic moieties of the linking group represented by l also may be substituted for example, with hydroxy, alkoxy, halogen, alkanoyloxy, cyano alkoxycarbonyl, aryl, aryloxy, cycloalkyl, etc. The cyclic moieties of linking group L may be substituted with alkyl as well as with the substituts already mentioned. In addition to the possible substitution described above, the nitrogen atom of the nitrogen containing alkylene groups may be substituted, for example, with alkyl, aryl, alkanoyl, aroyl, alkylsulfonyl, or carbamoyl, e.g.,

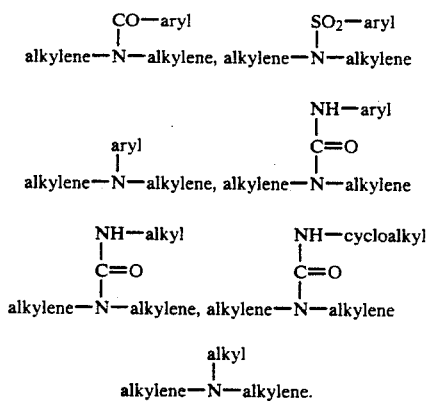

In the above definitions of L, the term "alkylene" represents a straight or branched chain divalent hydrocarbon radical which contains from one to about eight carbon atoms. The term "carbocylic arylene" refers to phenylene radicals and same substituted with $C_1$-$C_4$ alkyl, $C_1$-$C_4$ alkoxy or halogen.

In one embodiment, and referring to the above formula for the uv absorber, X is $-CO_2R_6$ and $R_6$ is an alkyl group having from 1 to about 10 carbon atoms, $R_1$ is hydrogen, an alkyl group having from 1 to about 10 carbon atoms, or a substituted alkyl group having from 1 to about 10 carbon atoms, and $R_2$ is an alkyl group having from 1 to about 10 carbon atoms.

In another embodiment, X is $-CO_2R_6$ wherein $R_6$ is an alkyl group having from 1 to about 10 carbon atoms, $R_2$ is an alkyl group having from 1 to about 10 carbon atoms, and $R_1$ has the formula:

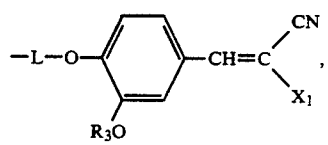

wherein $X_1$ is $-CO_2R_6$ and $R_6$ is as defined hereinabove, and $R_3$ is an alkyl group having from 1 to about 10 carbon atoms.

In yet another embodiment, $R_1$ is hydrogen, an alkyl group having from 1 to about 10 carbon atoms, or a substituted alkyl group having from 1 to about 10 carbon atoms, $R_2$ is an alkyl group having from 1 to about 10 carbon atoms, and X has the formula:

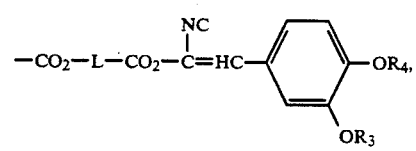

wherein $R_3$ is an alkyl group having from 1 to about 10 carbon atoms, and $R_4$ is hydrogen, an alkyl group having from 1 to about 10 carbon atoms, or a substituted alkyl group having from 1 to about 10 carbon atoms.

A suitable weight proportion of the ultraviolet light absorbing compound to the polyester is from about 200 to about 1600 parts per million. In another embodiment, the weight proportion of the ultraviolet light absorbing compound to the polyester is from about 400 to about 800 parts per million.

The intensifying screens employed in the invention are capable of emitting substantially within the ultraviolet spectral range, i.e. at about 400 nm. or less. Such screens are well known in the art and are described, for example, in U.S. Pat. No. 3,822,131, issued Jul. 2, 1974, to Cleare, and Belgian Pat. 703,998, issued Mar. 18, 1968, to Luckey, both of which are herein incorporated by reference as if fully set forth.

The silver halide emulsion layer may contain varying amounts of silver chloride, silver iodide, silver bromide, silver chlorobromide, silver bromoiodide and the like. Conventional overcoat layers may be employed to protect the emulsion layers from damage such as abrasion and scratches.

The radiographic elements can contain additional conventional features. Referring to *Research Disclosure*, item 18431, cited above, the emulsion layer units can contain stabilizers, antifoggants, and antikinking agents of the type set forth in Section II, and the overcoat layers can contain any of variety of conventional addenda of the type set forth in Section IV. The outermost layers of the radiographic element can also contain matting agents of the type set out in *Research Disclosure*, Vol. 308, December 1989, Item 308119, Section XVI. Referring further to *Research Disclosure*, Item 308119, incorporation of the coating aids of Section XI, and the antistatic layers of Section XIII, are each contemplated.

Figure 1:
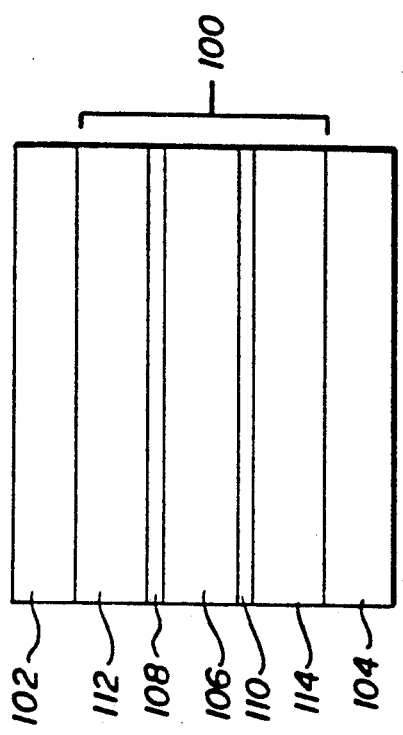
FIG. 1 is a cross-section, not to scale, of a photographic element of the invention.

Referring to FIG. 1, in the assembly shown a radiographic element 100 according to this invention is positioned between a pair of ultraviolet light-emitting intensifying screens 102 and 104. The radiographic element 100 is comprised of a support 106, typically transparent or blue tinted, capable of transmitting at least a portion of the light to which it is exposed and optional, similarly transmissive under layer or sub layer units 108 and 110. Silver halide ultraviolet light-sensitive emulsion layers 112 and 114 are respectively disposed on subbing layers 108 and 110 if present or on opposing surfaces of support 106 when the subbing layers are not present.

In use, the assembly is imagewise exposed to X radiation. The X radiation is principally absorbed by intensifying screens 102 and 104, which promptly emit ultraviolet light as a direct function of X ray exposure. Considering first the light emitted by screen 102, the light recording, ultraviolet light-sensitive, latent image-forming layer unit 112 is positioned adjacent this screen to receive the light which it emits. Because of the proximity of screen 102 to emulsion layer unit 112 only minimal light scattering occurs before latent image-forming absorption occurs in emulsion layer 112. Hence light emission from screen 102 forms a sharp image in emulsion layer 112. However, not all of the light emitted by screen 102 is absorbed within emulsion layer 112. This remaining light, unless otherwise absorbed, will reach remote emulsion layer unit 114, resulting in a highly unsharp image being formed in this remote emulsion layer unit. Polyester support 100 copolymerized with an ultraviolet light-absorbing compound of the invention is capable of intercepting and attenuating this remaining light, reducing crossover exposure of emulsion layer 122 by screen 102. In an exactly analogous manner, screen 104 produces a sharp image in light recording, ultraviolet light-sensitive emulsion layer unit 122, and polyester support 100 similarly reduces crossover exposure of emulsion layer unit 120 by the ultraviolet light emitted by screen 104.

Following exposure to produce a stored latent image, radiographic element 100 can be removed from association with intensifying screens 102 and 104 and processed in a suitable readily available processor of a type well known in the art.

The radiographic elements of the present invention make possible the unique combination of advantages set forth above by employing an ultraviolet light-absorbing compound of the invention as described above copolymerized with the polyester support. The radiographic element exhibits good crossover reduction without substantially incurring a disadvantageous yellow hue.

The preparation and the properties of the radiographic element of the invention is illustrated by the following examples. Additional descriptions of some ultraviolet light-absorbing compounds of the invention and of their preparation may be found in U.S. Pat. Nos. 4,617,374, 4,749,774, and 4,994,512, the disclosures of which are incorporated herein by reference as if fully set forth. The preparation of some of the ultraviolet light-absorbing compounds of the invention is also illustrated by the following examples.

PREPARATION OF COMPOUNDS

The intermediate aldehydes useful in preparing the compounds used in the practice of the invention are known or are prepared by known methods. For example, intermediate aldehydes A (below) are prepared by well-known reactions such as those described in H. Szmant, "Organic Building Blocks of the Chemical Industry", John Wiley and Sons, New York (1989), pp 234 and 514). In one method, catechol is monoalkylated by reacting with suitable alkylating agents such as alkyl halides, alkyl sulfates, and alkyl phosphates, and the like, to give catechol monoalkyl ethers, which undergo the Reimer-Tieman reaction to give intermediate aldehydes A, as follows:

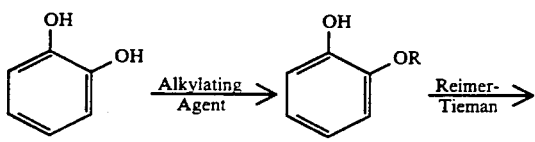

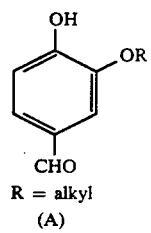

R = alkyl
(A)

Aldehydes A may also be prepared by reacting piperonal with HBr to give 3,4-dihydroxybenzaldehyde which may be alkylated with suitable alkylating agents to produce A as follows:

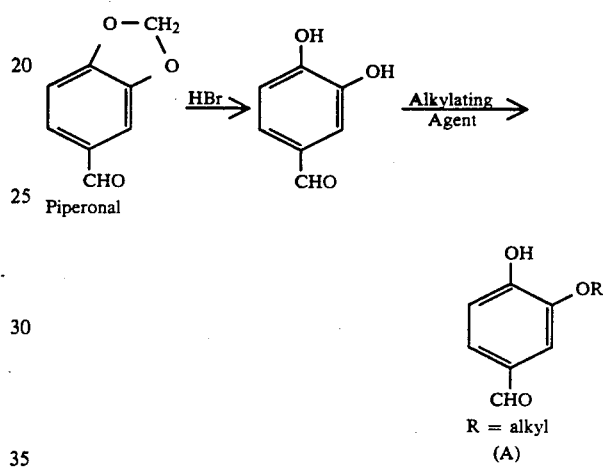

Piperonal

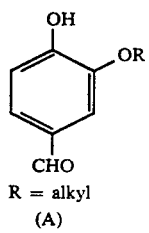

R = alkyl
(A)

These aldehydes A may be used directly to prepare UV absorbing compounds useful in the practice of the invention or may be reacted further to produce useful, more highly substituted benzaldehydes, as in Example 1 of U.S. Pat. No. 4,707,537 (supra), and as in the examples below.

Methods of preparation of bis-aldehydes useful in preparing bis-methine compounds useful in the practice of the invention are described in U.S. Pat. Nos. 4,749,774 (supra) and 4,994,512 (supra).

Methods useful in reacting the intermediate aldehydes with the active methylene compounds are well known and are described in the above patents and the examples below.

EXAMPLE 1

Preparation of Methyl 2-Cyano-3-(4-Hydroxy-3-Methoxyphenyl)-2-Propenoate

A mixture of vanillin (7.60 g, 0.05 mol), methyl cyanoacetate (4.95 g, 0.05 mol), ethanol (50 mL), piperidine (12 drops) and acetic acid (6 drops) is heated at reflux for 3 hours with stirring and then cooled. The pale yellow product crystallizes and additional ethanol (25 mL) is added to promote stirring and 5% HCl (10 mL) is added to neutralize any phenol salt present. The product, methyl 2-cyano-3-(4-hydroxy-3-methoxyphenyl)-2-propenoate, is collected by filtration, washed with ethanol and dried in air. A yield of 9.4 g (80.6%) is obtained. The identity of the product is supported by mass spectroscopy analysis and is shown below as compound I.

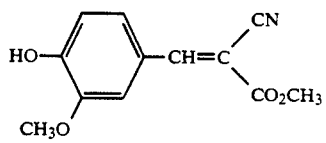 (I)

EXAMPLE 2

Preparation of 4-(Benzyloxy)-3-Methoxy-Benzaldehyde

Sodium hydroxide (2.4 g) is dissolved in water (50 mL) by stirring. Vanillin (7.60 g, 0.05 mol) and α-chloro-toluene (7.60 g, 0.06 mol) are added and the reaction mixture is heated at reflux with stirring for 16 hours. The product is extracted from the aqueous mixture using methylene chloride (10 mL). When the solvent is removed under vacuum an oil results which crystallizes when treated with isopropyl alcohol and stirred. Mass spectrometry supports the following structure:

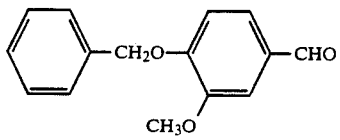

EXAMPLE 3

Preparation of Methyl 3-(4-Benzyloxy-3-Methoxyphenyl)-2-Cyano-2-Propenoate

A mixture of 4-(benzyloxy)-3-methoxybenzaldehyde (1.21 g, 0.005 mol), methyl cyanoacetate (0.50 g, 0.005 mol) methanol (10.0 mL) and piperidine (5 drops) is heated and stirred at reflux for 1 hour and cooled. The product, 3-(4-benzyloxy-3-methoxyphenyl)-2-cyano-2-propenoate is collected by filtration, washed with methanol and dried in air. The yield is 1.50 g (93%) of product having an absorption maximum at 364 nm in methylene chloride solution. The identity of the product is supported by mass spectrometry.

EXAMPLE 4

Preparation of Methyl 2-Cyano-3-]4-(2-Hydroxyethoxy)-3-methoxyphenyl]-2-Propenoate A mixture of 4-(2-hydroxyethoxy)-3-methoxybenzaldehyde (0.98 g, 0.005 mol), (see Example 1 of U.S. Pat. No. 4,707,537, supra) methyl cyanoacetate (0.50 g, 0.005 mol), piperidine (3 drops) and methanol (10 mL) is heated and stirred at reflux for 1 hour and cooled. The pale yellow product is collected by filtration, washed with methanol and dried in air. A yield of 1.0 g (72%) of product is obtained which has the following structure as supported by mass spectrometry:

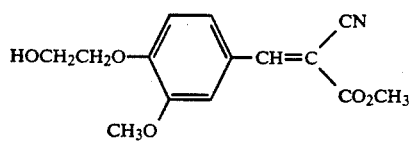

The compound has an absorption maximum at 365 nm in methylene chloride.

EXAMPLE 5

Preparation of Ethyl 2-Cyano-3-(3-Hydroxy-4-Methoxyphenyl-2-Propenoate

A mixture of 3-hydroxy-4-methoxybenzaldehyde (isovanillin) (1.52 g, 0.01 mol), ethyl cyanoacetate (1.13 g, 0.01 mol), ethanol (20.0 mL) and piperidine (5 drops) is heated at reflux for 1 hour. The reaction mixture is cooled and acidified to pH of about 4–5 with 10% HCl to produce the product which is collected by filtration, washed with ethanol and air dried. A yield of 1.36 g (55%) of product is obtained which corresponds to the following structure as supported by mass spectrometry:

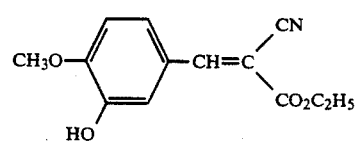

The compound has an absorption maximum (λ max) at 354 nm in methylene chloride solution.

EXAMPLE 5

Preparation of Methyl 2-Cyano-3-(3,4-Dimethoxyphenyl)2-Propenoate

A mixture of 3,4-dimethoxybenzaldehyde 4.15 g, 0.025 mol), methyl cyanoacetate (2.48 g, 0.025 mol), methanol (100 mL) and piperidine (10 drops) is heated at reflux for 2 hours. The reaction mixture is then cooled and the product collected by filtration, washed with methanol and dried in air (yield—6.0 g, 97%). The following structure is supported by mass spectrometry:

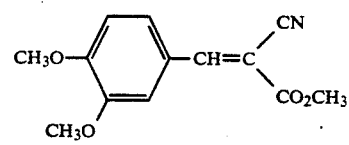

The compound has an absorption maximum at 361 nm in methylene chloride.

EXAMPLE 7

Preparation of Ethyl 2-Cyano-3-(4-Carbethoxymethoxy-3-Methoxyphenyl)-2-Propenoate A mixture of 4-carbethoxymethoxy-3-methoxybenzaldehyde (23.8 g, 0.10 mol), ethyl cyanoacetate (11.3 g, 0.10 mol), ethanol (150 mL) and piperidine (2 mL) is heated at reflux for 4 hours. The reaction mixture is allowed to cool, and the solid is collected by filtration, washed with ethanol and dried in air. A yield of 31.3 g (93%) of product is obtained which has the following structure as supported by mass spectrometry:

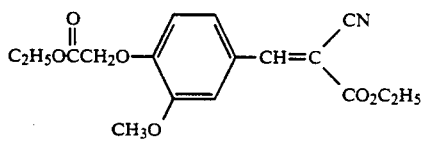

An absorption maximum at 355 nm is observed when the product is dissolved in methylene chloride.

EXAMPLE 8

Preparation of 3-[4(2-Hydroxyethoxy)-3-Methoxyphenyl]-2-Methylsulfonyl-2-Propene Nitrile A mixture of 4-(2-hydroxyethoxy)-3-methoxybenzaldehyde (0.98 g, 0.005 mol), (see Example 1 of U.S. Pat. No. 4,707,537, supra), methylsulfonylacetonitrile (0.60 g, 0.005 m), ethanol (10 mL) and piperidine (5 drops) is heated at reflux for 1 hour, during which time the product crystallizes. The reaction mixture is allowed to cool and the very pale yellow product is collected by filtration, washed with ethanol and dried in air. The yield of product is 1.05 g (70.9%). Mass spectrometry supports the following structure:

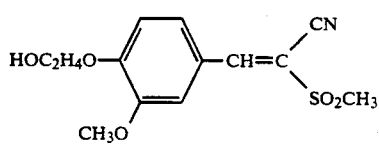

In methylene chloride the product has an absorption maximum at 362 nm.

EXAMPLE 9

Preparation of 2-Cyano-3-(4-Hydroxy-3-Methoxyphenyl)-2-Propenamide

A reaction mixture of vanillin (1.52 g, 0.01 mol), α-cyanoacetamide (0.84 g, 0.01 mol), ethanol (25 mL) and piperidine (6 drops) is heated at reflux for 1 hour and then allowed to cool to room temperature. The reaction mixture is acidified to pH of about 3-4 by addition of a few drops of concentrated HCl. The product which is collected by filtration, washed with ethanol and dried in air has the following structure supported by mass spectrometry:

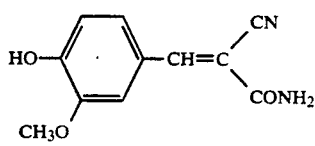

The yield of product is 1.5 g (68.8%). In methylene chloride the product has an absorption maximum of 352 nm.

EXAMPLE 10

A reaction mixture of vanillin (1.96 g, 0.01 mol), 1,2-ethanediyl bis(α-cyanoacetate) (3.04 g, 0.02 mol), N,N-dimethylformamide (10 mL) and piperidine acetate (0.2 g) is heated and stirred at 90°-95° C. for 1.5 hour, allowed to cool to room temperature, and drowned into methanol (100 mL). The pH is adjusted to 3-4 by addition of conc. HCl and the solid product is collected by filtration, washed with methanol and dried in air. A yield of 2.1 g of product having the structure

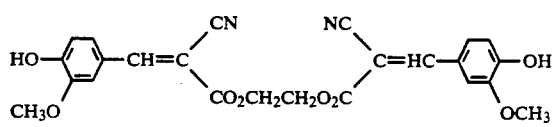

as evidenced by NMR and mass spectrum analyses is obtained. In methylene chloride the compound has an absorption maximum of 365 nm and an extinction coefficient of 40,490.

EXAMPLE 11

To a solution of vanillin (4-hydroxy-3-methoxybenzaldehyde, 91.2 g, 0.60 mol) dissolved in water (500 mL) containing sodium hydroxide (24.0 g, 0.60 mol) is added 1,2-dibromoethane (56.7 g, 0.30 mol) and the reaction mixture is stirred and heated to reflux for 8 hours and then allowed to cool. The product, 4,4'-](1,2-ethanediyl)bis(oxy)bis(3-methoxybenzaldehyde)], is collected by filtration, washed with water and dried in air. A yield of 67.5 g (68%) of a slightly gray solid is obtained. The identity of the product is supported by mass spectroscopy analysis.

A mixture of 4,4'-[(1,2-ethanediyl)bis(oxy)bis(3-methoxybenzaldehyde)] (49.5 g, 0.15 mol), methyl cyanoacetate (30 g, 0.30 mol), N,N-dimethylformamide (500 mL), piperidine (3 mL) and acetic acid (1 mL) is heated with stirring at about 100° C., for 2 hours. The reaction mixture is allowed to cool to room temperature and the pale yellow solid which forms is collected by filtration and washed with methanol. The crude product is reslurried in 500 mL of boiling methanol, collected by filtration, washed with methanol and dried in air. A yield of 59.4 g (81%) of dimethyl 3,3'-](1,2-ethanediyl)bis(oxy)bis(3-methoxy-4,1-phenylene)-bis(2-cyano-2-propenoate)] having the formula:

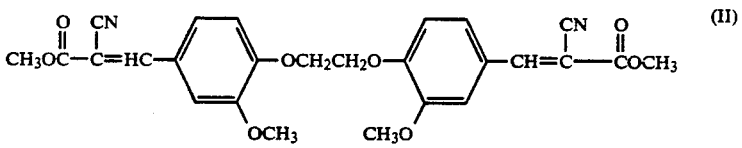

and designated as compound II is obtained.

Additional examples of methine compounds which may be used in the preparation of the X-ray elements of the invention are set forth in the following tables in which the compounds of each table conform to the structural formula immediately preceding each such table. These compounds may be prepared according to the procedures described above.

TABLE 1

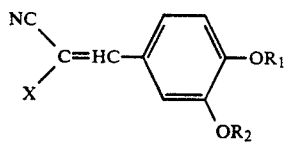

| EXAMPLE NUMBER | X | R₁ | R₂ |
|---|---|---|---|
| 12 | —$CO_2C_2H_5$ | —$C_2H_5$ | —$CH_3$ |
| 13 | —$CO_2C_6H_{11}$ | —$C_4H_9$-n | —$CH_3$ |
| 14 | —$CO_2CH_2CH=CH_2$ | —$CH_2CH=CH_2$ | —$CH_3$ |
| 15 | —$CO_2CH_2CH_2OH$ | —$C_6H_5$ | —$CH_3$ |
| 16 | —$CO_2CH_2C_6H_5$ | —$CH_2C_6H_5$ | —$CH_2C_6H_5$ |
| 17 | —$CO_2CH_2CH_2CN$ | —$C_6H_{11}$ | —$CH_3$ |
| 18 | —$CO_2CH_2C\equiv CH$ | —$CH_2C_6H_{11}$ | —H |
| 19 | —$CO_2CH_2CH(C_2H_5)C_4H_9$-n | —$(CH_2)_{11}CH_3$ | —$CH_3$ |
| 20 | —$CO_2C_6H_5$ | —$(CH_2)_{18}CH_3$ | —$CH_3$ |
| 21 | —$CO_2C_5H_9$ | —$CH_2CH_2OH$ | —$C_6H_{11}$ |
| 22 | —$CO_2CH_3$ | —$CH_2CH=CH_2$ | —$CH_3$ |
| 23 | —$CO_2CH_3$ | —$CH_3$ | —$CH_2C\equiv CH$ |
| 24 | —$CO_2CH_3$ | —$CH_2C_6H_4$-p-$CO_2CH_3$ | —$CH_3$ |
| 25 | —$CO_2CH_3$ | —$C_6H_4$-p-$CO_2CH_3$ | —$CH_3$ |
| 26 | —$CO_2CH_2CH_2Cl$ | —$CH_2CH_2OCOCH_3$ | —$CH_3$ |
| 27 | —$CO_2CH_2CH_2OC_6H_5$ | —$CH_2CH_2OC_6H_5$ | —$CH_3$ |
| 28 | —$CO_2CH_2CH_2CN$ | —$CH_2CH_2Cl$ | —$CH_3$ |
| 29 | —$CO_2CH_2CH(OH)CH_2OH$ | 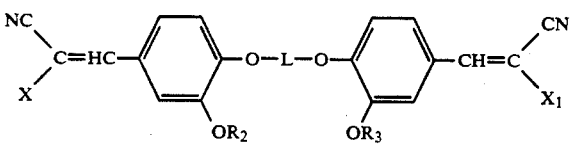 | —$CH_3$ |
| 30 | —$SO_2CH_3$ | —$CH_2OCO_2C_2H_5$ | —$CH_3$ |
| 31 | —$SO_2C_6H_5$ | —$CH_2CH_2OCOCH_3$ | —$CH_3$ |
| 32 | —$SO_2C_6H_4$-p-Cl | —$CH_2C_6H_4$-p-$CO_2CH_3$ | —$CH_3$ |
| 33 | —$SO_2C_6H_4$-p-$OCH_3$ | —H | —$CH_2CH_2OH$ |
| 34 | —$CONH_2$ | —$CH_2CH_2OH$ | —$CH_3$ |
| 35 | —$CONHC_6H_5$ | —$CH_2OCO_2C_2H_5$ | —$CH_3$ |
| 36 | —$CONHC_6H_{11}$ | —$CH_2CH_2OCH_2CH_2OH$ | —$CH_3$ |
| 37 | —$CONHCH_2C_6H_5$ | —$CH_2CH_2OCOCH_3$ | —$CH_2CH_2OCOCH_3$ |
| 38 | —$CO_2CH_3$ | —$C_6H_4$-p-$CH_3$ | —$CH_3$ |
| 39 | —$CO_2CH_3$ | —$CH_3$ | —$CH_2C_6H_4$-p-$CO_2CH_3$ |

TABLE 2

| EXAMPLE NUMBER | X, X₁ | L | R₂, R₃ |
|---|---|---|---|
| 40 | —$CO_2CH_3$ | —$CH_2CH_2$— | —$CH_3$ |
| 41 | —$CO_2CH_3$ | $(-CH_2-)_4$ | —$C_2H_5$ |
| 42 | —$CO_2CH_3$ | $(-CH_2-)_8$ | —H |
| 43 | —$CO_2C_2H_5$ | —$CH_2CH_2OCH_2CH_2$— | —$C_4H_9$-n |
| 44 | —$CO_2(CH_2)_{11}CH_3$ | $CH_2C_6H_4$-p-$CH_2$— | —$CH_3$ |
| 45 | —$CO_2CH_2C_6H_{10}$-p$CH_2OH$ | —$CH_2C(CH_3)CH_2$— | —$CH_3$ |
| 46 | —$CO_2CH_2CH_2OC_6H_5$ | —$CH_2CH_2SO_2CH_2CH_2$— | —$CH_2C_6H_5$ |
| 47 | —$CO_2CH_2C\equiv CH$ | —$CH_2CH_2N(SO_2CH_3)CH_2CH_2$— | —$CH_2C_6H_{11}$ |
| 48 | —$CO_2CH_2CH_2OCH_2CH_2OH$ | —$CH_2CH_2SCH_2CH_2$— | —$C_2H_5$ |
| 49 | —$CO_2CH_2CH_2SCH_2CH_2OH$ | —$CH_2C_6H_{10}$-p-$CH_2$— | —$CH_3$ |
| 50 | —$CO_2CH_2C(CH_3)CH_2OH$ | $CH_2CH_2OC_6H_4$-p-$OCH_2CH_2$ | —$CH_3$ |
| 51 | —$CO_2CH_2CH(CH_3)CH_2OH$ | —$CH_2CH_2OCO(CH_2)_4OCOCH_2CH_2$— | —$CH_3$ |
| 52 | —$CO_2CH_2CH(CH_3)_2$ | —$CH_2CH_2OCOC_6H_4$-m-$OCOCH_2CH_2$— | —$CH_3$ |
| 53 | —$SO_2CH_3$ | —$CH_2CH_2OCO(CH_2)_2OCOCH_2CH_2$— | —$CH_3$ |
| 54 | —$SO_2C_6H_5$ | —$CH_2CH(OH)CH_2$— | —$CH_3$ |
| 55 | —$SO_2C_6H_3$-3,4-diCl | —$CH_2CH(OCOCH_3)CH_2$— | —$CH_3$ |
| 56 | —$SO_2C_4H_9$-n | —$CH_2CH(CH_2OH)$— | —$CH_3$ |
| 57 | —$CONH_2$ | —$CH_2CH_2OH(OH)CH_2CH_2$— | —$CH_3$ |
| 58 | —$CONHC_6H_5$ | —$CH_2CH(OH)CH_2$— | —$CH_3$ |
| 59 | —$CONHC_6H_4$-p-$OCH_3$ | —$CH_2CH_2$— | —$CH_2CO_2C_2H_5$ |
| 60 | —$CON(CH_3)C_6H_5$ | $(-CH_2-)_4$ | —$CH_2C_6H_4$-p-$CO_2CH_3$ |

TABLE 2-continued

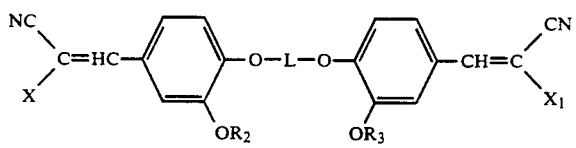

| EXAMPLE NUMBER | X, X₁ | L | R₂, R₃ |
|---|---|---|---|
| 61 | $-CON(C_2H_5)C_6H_{11}$ | $-CH_2C_6H_4\text{-}p\text{-}CH_2-$ | $-CH_2COOH$ |
| 62 | $-CONHCH_2CH=CH_2$ | $-CH_2CH_2CH(OH)CH_2-$ | $-CH_3$ |
| 63 | $-CONHC_7H_{13}$ | $-CH_2CH_2CH(OCO_2C_2H_5)CH_2-$ | $-CH_3$ |
| 64 | $-CONHC_6H_4-O-CH_3$ | $-CH_2CH_2CH(OH)CH_2-$ | $-CH_3$ |
| 65 | $-CONHC_6H_3\text{-}2\text{-}OCH_3-S-CH_3$ | $-CH_2CH(OH)CH_2-$ | $-CH_3$ |
| 66 | $-CONHC_3H_5$ | $-CH_2CH(OH)CH_2-$ | $-CH_2C_6H_{11}$ |
| 67 | $-CONHC_6H_4\text{-}p\text{-}OC_6H_5$ | $-CH_2CH(OH)CH_2-$ | $-CH_3$ |

TABLE 3

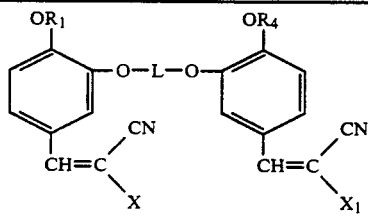

| EXAMPLE NUMBER | X, X₁ | L | R₁R₄ |
|---|---|---|---|
| 68 | $-CO_2CH_3$ | $-CH_2CH_2-$ | $-CH_3$ |
| 69 | $-CO_2C_2H_5$ | $-CH_2CH_2CH_2CH_2-$ | $-C_2H_5$ |
| 70 | $-CO_2CH_2CH_2OCH_3$ | $-CH_2CH_2OCH_2CH_2-$ | $-C_4H_9\text{-}n$ |
| 71 | $-CO_2CH_2CH_2OCH_2CH_2OCH_3$ | $-(CH_2)_8-$ | $-CH_2C_6H_5$ |
| 72 | $-SO_2C_2H_5$ | $-CH_2CH(OH)CH_2-$ | $-CH_3$ |
| 73 | $-SO_2C_6H_5$ | $-CH_2CH(OCOCH_3)CH_2-$ | $-CH_3$ |
| 74 | $-CONHC_6H_5$ | $-CH_2CH_2-$ | $-CH_2CO_2C_2H_5$ |
| 75 | $-CON(CH_3)C_6H_{11}$ | $-CH_2CH_2CH(OH)CH_2-$ | $-CH_2C_6H_{11}$ |
| 76 | $-CONHCH_2CH=CH_2$ | $-CH_2CH_2CH(OH)CH_2-$ | $-CH_3$ |
| 77 | $-CON(CH_3)C_6H_5$ | $-CH_2(OH)CH_2-$ | $-CH_3$ |
| 78 | $-CONH_2$ | $-CH_2CH(OH)CH_2-$ | $-CH_3$ |

TABLE 4

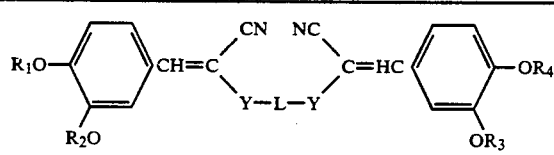

| EXAMPLE NUMBER | R₁ | R₂ | Y | L | R₃ | R₄ |
|---|---|---|---|---|---|---|
| 79 | $-CH_3$ | $-CH_3$ | $-CO_2$ | $-CH_2CH_2-$ | $-CH_3$ | $-CH_3$ |
| 80 | $-H$ | $-CH_3$ | $-CO_2$ | $-CH_2C(CH_3)_2-CH_2-$ | $-CH_3$ | $-H$ |
| 81 | $-CH_2CH_2OH$ | $-C_2H_5$ | $-CO_2$ | $-CH_2CH_2OCH_2CH_2-$ | $-C_2H_5$ | $-C_2CH_2OH$ |
| 82 | $-CH_3$ | $-H$ | $-CO_2$ | $-CH_2C_6H_{10}\text{-}pCH_2-$ | $-H$ | $-CH_3$ |
| 83 | $-CH_2CO_2C_2H_5$ | $-CH_3$ | $-CONH$ | $-CH_2CH_2-$ | $-CH_3$ | $-CH_2CO_2C_2H_5$ |
| 84 | $-CH_2C_6H_4\text{-}p\text{-}CO_2CH_3$ | $-CH_3$ | $-CONH$ | ⌬ | $-CH_3$ | $-CH_2C_6H_4\text{-}p\text{-}CO_2CH_3$ |
| 85 | $-CH_2CH_2OCOCH_3$ | $-CH_3$ | $-CONH$ | ⌬-CH₃ | $-CH_3$ | $-CH_2CH_2OCOCH_3$ |

TABLE 4-continued $$R_1O-\underset{R_2O}{\bigcirc}-CH=C\underset{Y-L-Y}{\overset{CN\ NC}{\diagdown\ \diagup}}C=HC-\underset{OR_3}{\bigcirc}-OR_4$$

| EXAMPLE NUMBER | R₁ | R₂ | Y | L | R₃ | R₄ |
|---|---|---|---|---|---|---|
| 86 | —CH₂CH₂OH | —CH₃ | —SO₂ | —C₆H₃(OCH₃)— | —CH₃ | —CH₂CH₂OH |
| 87 | —CH₂CH₂OH | —CH₃ | —SO₂ | —(CH₂)₄— | —CH₃ | —CH₂CH₂OH |
| 88 | —CH₃ | —CH₂CH₂OH | —CO₂ | CH₂CH₂OC₆H₄-p-OCH₂CH₂ | —C₂H₄OH | —CH₃ |
| 89 | —C₆H₄-p-CO₂CH₃ | —CH₃ | —CO₂ | —CH₂CH₂SCH₂CH₂— | —CH₃ | —C₆H₄-p-CO₂CH₃ |

EXAMPLE 90

Preparation of polyester support:

The following materials are placed in a 500-ml three-necked, round-bottom flask:

97 g (0.5 mol) dimethyl terephthalate
62 g. (1.0 mol) ethylene glycol
0.00192 g Ti from a n-butanol solution of acetyltriisopropyl titanate
0.0053 g Mn from an ethylene glycol solution of antimony acetate
0.0072 g Co from an ethylene glycol solution of cobaltous acetate The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 ml of an ethylene glycol slurry of a mixed phosphorous ester composition (Zonyl A) which contains 0.012 g phosphorus is added. The temperature of the bath is increased to 230° C. At 230° C. an ultraviolet light-absorbing compound of the invention, compound II of above EX. 11 (dimethyl 3,3'-[(1,2-ethanediyl)bis(oxy)-bis(3-methoxy-4,1-phenylene)-bis(2-cyano-2-propenoate)]) in the amount of 0.0384 g, is added to the flask. Five minutes after this addition, a vacuum with a slow stream of nitrogen bleeding in the system is applied over a five minute period until the pressure is reduced to 200 mm Hg. The flask and contents are heated at 270° C. under a pressure of 100 mm Hg for 30 minutes. The metal bath temperature is increased to 285° C. and the pressure is slowly reduced to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting copolymer has an inherent viscosity of about 0.52 measured in a 60/40 percent ratio by weight of phenol/tetrachloroethane solvent at a concentration of 0.5 g of polymer per 100 ml solvent. The weight proportion of uv absorber to poly (ethylene terephthalate) in the copolymer is about 800 ppm. A 14 mil thick, stretched, biaxially oriented film is cast from this copolymer, and a transmission spectrum of the film is then obtained using a Perkin-Elmer Lambda 6 UV/Vis Spectrophotometer. The results are shown in FIG. 2 with the y-axis being unitless to show relative absorbance to the film prepared in Example 91, below.

EXAMPLE 91

Poly (ethylene terephthalate) granules (I.V. between about 0.55 and about 0.70 dl/g=about 0.63 as measured in a 60:40 percent by weight solution of phenol and chlorobenzene at 25° C.) are vacuum dried and dry blended with the same ultraviolet light-absorbing compound II of above EX. 11 as in Example 90 bearing a weight proportion of about 800 ppm to the poly (ethylene terephthalate). The blend is dried overnight (16 hours) in a vacuum oven at 110° C. After drying, the material is melt blended and extruded into 7 mil thick film on a 1 inch Killion extruder (25 to 1 L/D). A transmission spectrum of the 7 mil film is then obtained using a Perkin-Elmer Lambda 6 UV/Vis Spectrophotometer. The results are shown in FIG. 2 and as stated above are "relative absorbance", that is, the units were normalized for comparison purposes.

Figure 2:
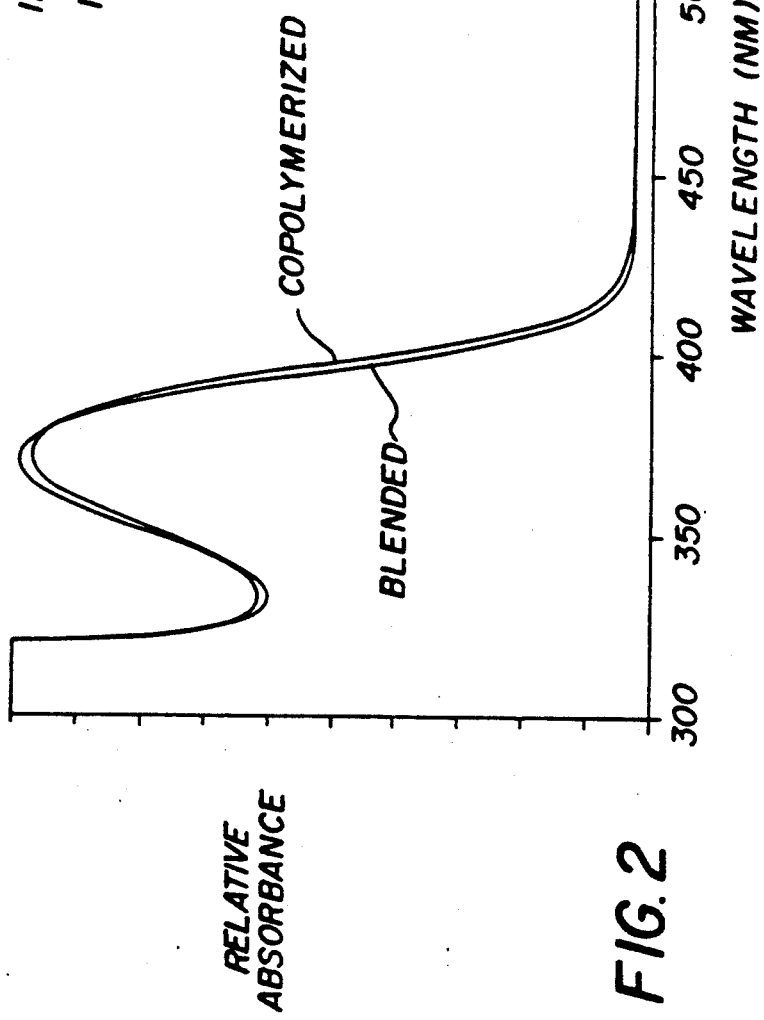
FIG. 2 is a graph showing absorbance curves of PET film respectively copolymerized and admixed with one of the uv absorbents used in the invention.

As seen from FIG. 2, the absorbance spectrum of PET film admixed with 800 ppm of the uv absorber and of PET film copolymerized with 800 ppm of the uv absorber are almost identical. In order to facilitate preparation of the support materials and because of the substantial identity of results, further tests below were carried out using the admixed procedure. The results are directly predicative of the characteristic ultraviolet absorbance properties of the copolymerized radiographic elements of the invention.

EXAMPLES 92-101

A 7 mil clear poly (ethylene terephthalate) support is prepared as a control, and 7 mil poly (ethylene terephthalate) support materials are prepared according to the procedure of EX. 91 above, each containing 800 ppm by weight of an ultraviolet light-absorbing compound as follows:

Film support 1: Control PET 7 mil film sample (contains no uv absorbing compound).

Figure 3:
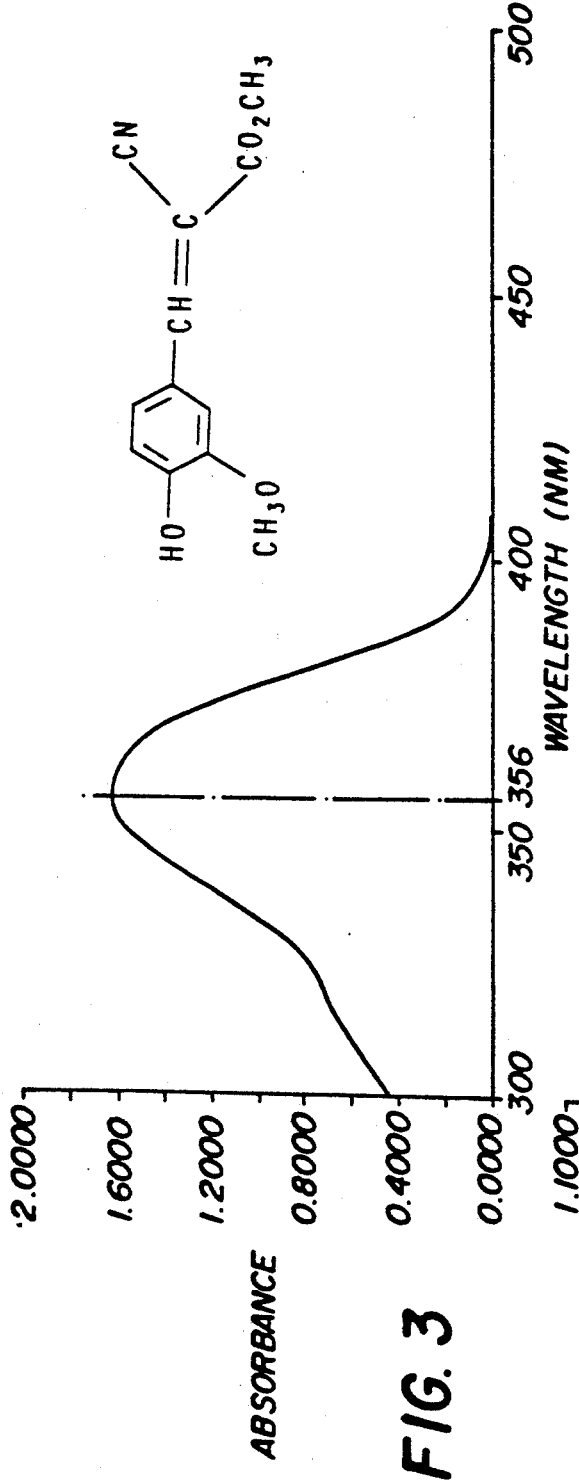
FIG. 3 is an absorbance curve of one of the uv absorbers, Compound I, used in the invention. Compound I has an absorption maximum ($\lambda$ max) at 356 nm in methylene chloride in the UV absorption spectrum. The extinction coefficient ($\epsilon$) is equal to 37,105.

Film support 2 contains the compound of EX. 1 hereinafter identified as "Compound I"). FIG. 3 is the characteristic absorption curve of compound I.

Figure 4:
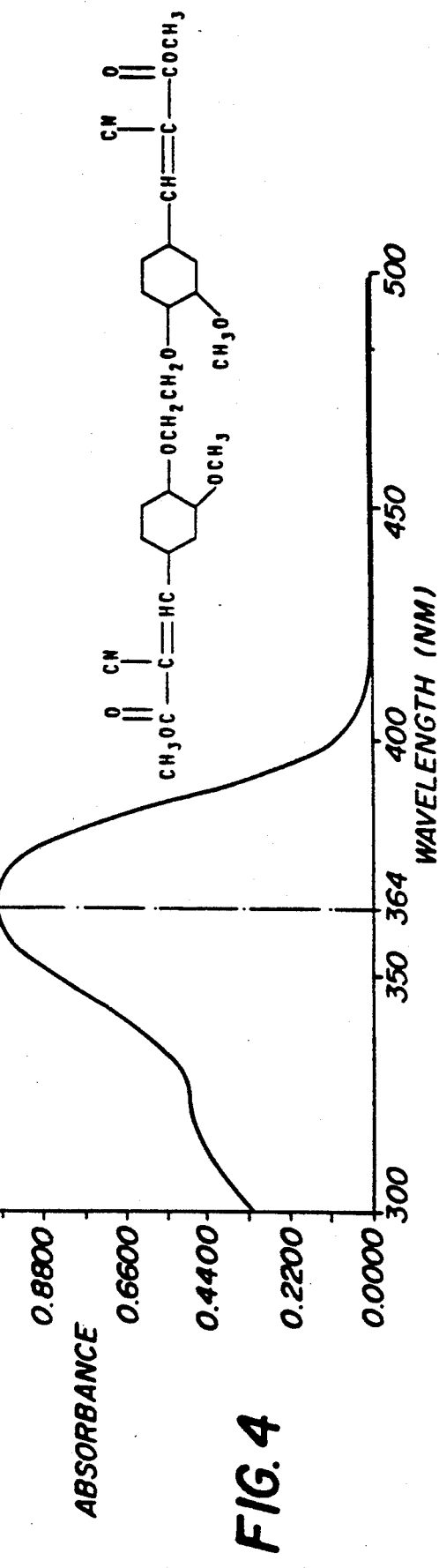
FIG. 4 is an absorbance curve of another uv absorber, Compound II, used in the invention. Compound II has an absorption maximum ($\lambda$ max) at 364 nm in methylene chloride ($\epsilon = 45,458$).

Film support 3 contains the compound of EX. 11 hereinafter identified as "Compound II". FIG. 4 is the characteristic absorption curve of compound II.

Film support 4 (Comparison) contains an ultraviolet light-absorbing compound having the structure

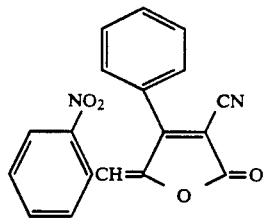

(III)

Figure 5:
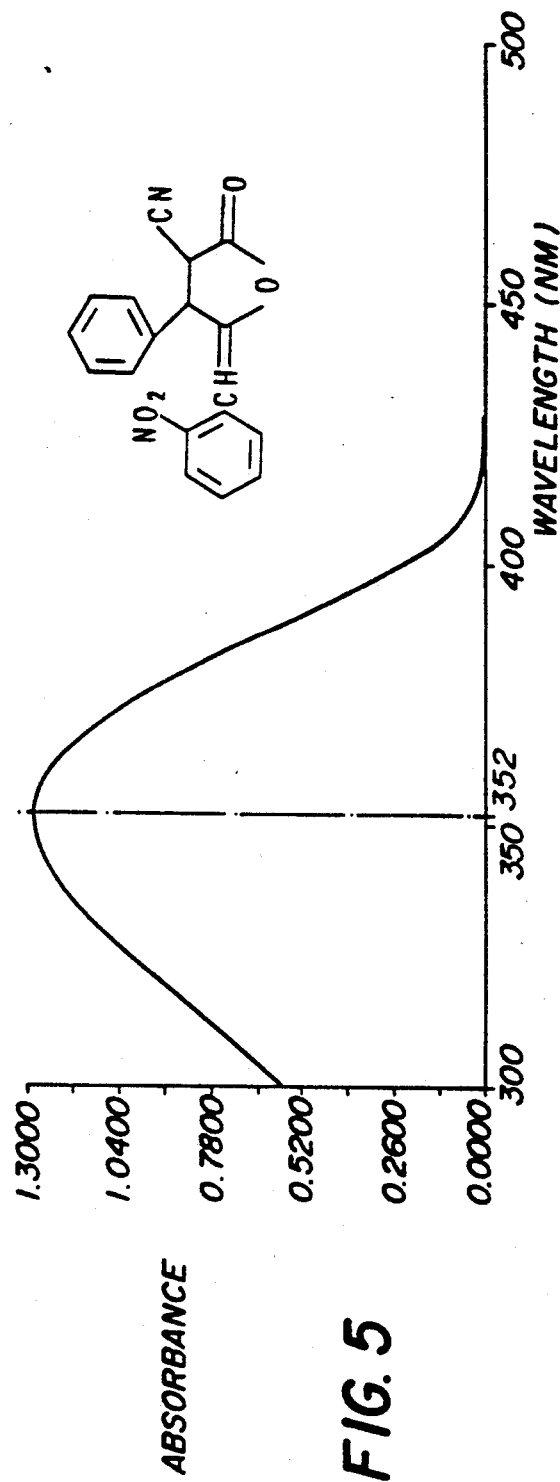
FIG. 5 an absorbance curve of a comparison uv absorber. The compound has an absorption maximum ($\lambda$ max) at 352 nm in methylene chloride ($\epsilon = 40,944$).

FIG. 5 is the characteristic absorption curve of compound III.

Film support 5 (Comparative example) contains an ultraviolet light-absorbing compound of the invention having the structure

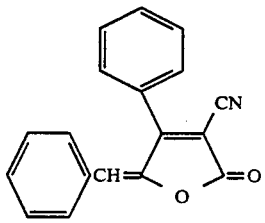

(IV)

Figure 6:
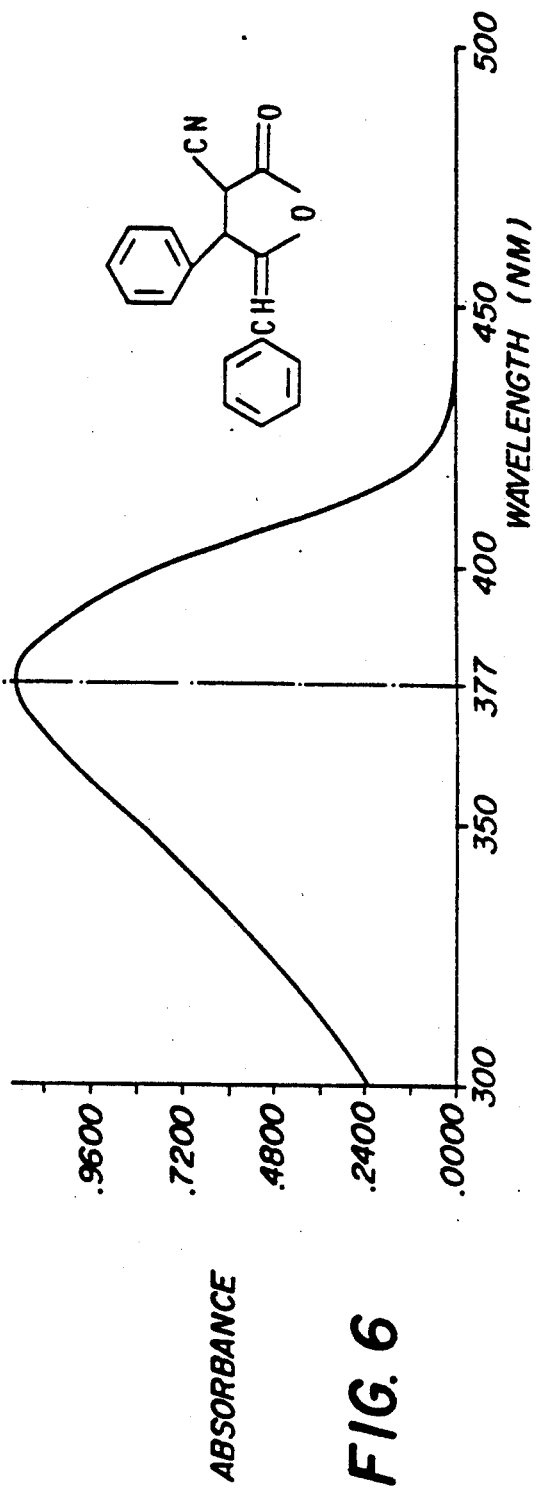
FIG. 6 an absorbance curve of a comparison uv absorber. The compound has an absorption maximum ($\lambda$ max) at 377 nm in methylene chloride ($\epsilon = 29,380$).

FIG. 6 is the characteristic absorption curve of compound IV.

Additional 7 mil PET film supports are also prepared with the above compounds and also containing 250 ppm by weight of a blue dye, 1,4-bis(2,6-diethylanilino)-anthraquinone, admixed with each such PET support.

Transmission spectra are obtained for each sample using standard techniques. The results are shown in FIGS. 7 and 8 and in Table 5 below:

TABLE 5

| EXAMPLE NO.: | 7 mil PET Film Support No.: | Containing 800 ppm of Compound: |
|---|---|---|
| 92 | 1 | None (control) |
| 93 | 2 | II |
| 94 | 3 | I |
| 95 | 4 | III |
| 96 | 5 | IV |
| 97 | 6 | None (control) + 250 ppm blue dye |
| 98 | 7 | II + 250 ppm blue dye |
| 99 | 8 | I + 250 ppm blue dye |
| 100 | 9 | III + 250 ppm blue dye |
| 101 | 10 | IV + 250 ppm blue dye |

Colorimetry data is obtained for each sample using standard techniques and the results are shown in Table 6, below. The term "B*" is the Tone value.

TABLE 6

| Film Support | B* |
|---|---|
| 1 | 0.45 |
| 2 | 1.11 |
| 3 | 1.07 |
| 4 | 5.13 |
| 5 | 1.92 |
| 6 | −16.20 |
| 7 | −15.50 |
| 8 | −15.70 |
| 9 | −10.40 |

TABLE 6-continued

| Film Support | B* |
|---|---|
| 10 | −12.70 |

FIGS. 7 and 8 of percent transmission for the same weight proportion of each uv absorber in the PET support, with and without 250 ppm by weight of 1,4-bis(2,6-diethylanilino)-anthraquinone blue dye, show that the supports containing compound I and compound II exhibit better absorption in the ultraviolet range of about 350 nm to about 395 nm than does compound III at the same weight proportion of 800 ppm. The supports containing compounds I and II also show less unwanted absorption in the visible range above 400 nm. As a result, the poly (ethylene terephthalate) supports containing compounds I and II can employ a lower weight percent of uv absorber than a support containing compound III for a similar amount of uv absorption. A support containing an ultraviolet light-absorbing compound of the invention therefore exhibits less undesirable yellow hue than a support containing compound III.

The colorimetry results in Table 6 can be interpreted in that the more negative the value of the tone (B*), the colder is the tone and hence the more desirable is the support. A "Just Noticeable Difference" (JND) is 0.7. Thus in Table 6 there is no noticeable difference between support 2 and 3, and the good tone of the support containing compound I is not noticeably different than the support containing compound II which also exhibits good tone. When the colorimetry results of film supports 2 and 3, containing compounds I and II, respectively, are compared to film supports 4 and 5, respectively, it is noted that the film supports which contain the prior art compounds have significantly more objectionable yellow color, i.e. a more positive value of B*. The same results are obtained even when the blue toner dye is added (film supports 7 and 8 as compared to film supports 9 and 10, respectively, in Table 6).

EXAMPLE 102

The 7 mil PET supports of EXS. 1 and 11 respectively containing compound I and compound II are each coated with a standard silver halide emulsion layer on each side of the support and are each assembled into a radiographic element of the invention. Each element is tested for stated loadings of absorber compound for speed, percent crossover, and percent transmittance in the wavelength ranges of 350–395 nm and 400–430 nm and the results shown in Table 7, below, and in FIG. 9. Table 7 shows the percent transmittance in the stated wavelength ranges for the stated absorber loadings. FIG. 9 graphs speed, percent crossover, and percent transmittance at 380 nm.

Both radiographic elements exhibit good crossover reduction while maintaining good film speed, and exhibited good transmittance, especially in the range of about 400 ppm to about 800 ppm.

TABLE 7

| Element containing Compound: | Loading (ppm) | Percent Transmittance (350–395 nm) | Percent Transmittance (400–430 nm) |
|---|---|---|---|
| 1 | 200 | 39.00 | 74.42 |
| 1 | 400 | 21.83 | 73.54 |
| 1 | 800 | 5.95 | 63.32 |
| 1 | 1600 | 1.03 | 56.17 |
| 2 | 200 | 39.38 | 75.66 |

TABLE 7-continued

| Element containing Compound: | Loading (ppm) | Percent Transmittance (350–395 nm) | Percent Transmittance (400–430 nm) |
|---|---|---|---|
| 2 | 400 | 23.48 | 71.51 |
| 2 | 800 | 6.00 | 62.51 |
| 2 | 1600 | 2.40 | 57.61 |

This invention has been described above with particular reference to preferred embodiments. A skilled practitioner familiar with the detailed description above, can make many substitutions and modifications without departing from the scope and spirit of the appended claims.

We claim:

1. A radiographic image-recording element, comprising:
a support consisting essentially of polyester, said polyester being a copolymer of an alcohol of a diol and a diester and having opposed major surfaces;
an ultraviolet light-sensitive silver halide emulsion layer coated on each of said surfaces; and
copolymerized with said polyester at least one ultraviolet light absorbing compound having the formula:

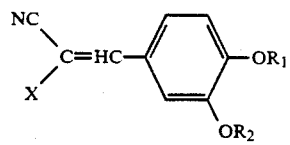

wherein
$R_1$ and $R_2$ are independently selected from the group consisting of:
alkyl groups having from 1 to about 20 carbon atoms, cycloalkyl groups having from about 3 to about 7 carbon atoms, and aryl groups having from 6 to about 12 carbon atoms, all of which may be substituted;
alkenyl groups having from about 3 to about 10 carbon atoms;
alkynyl groups having from about 3 to about 10 carbon atoms;
hydrogen;
groups of the formula:

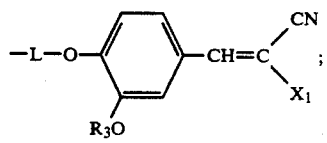

and groups of the formula:

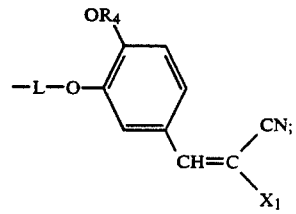

wherein L is an organic divalent linking group;
$R_3$ and $R_4$ are selected from the group consisting of:
alkyl groups having from 1 to about 20 carbon atoms, cycloalkyl groups having from about 3 to about 7 carbon atoms, and aryl groups having from 6 to about 12 carbon atoms, all of which may be substituted;
alkenyl groups having from about 3 to about 10 carbon atoms;
alkynyl groups having from about 3 to about 10 carbon atoms; and
hydrogen;
X and $X_1$ are independently selected from —CON($R_5$)$R_6$, —CO$_2R_6$ and —SO$_2R_6$, wherein:
$R_5$ is hydrogen or an alkyl group having from 1 to about 20 carbon atoms;
$R_6$ is an alkyl group having from 1 to about 20 carbon atoms, a cycloalkyl group having from about 3 to about 7 carbon atoms, or an aryl group having from 6 to about 12 carbon atoms, all of which may be substituted; an alkenyl group having from about 3 to about 7 carbon atoms; an alkynyl group having from about 3 to about 10 carbon atoms; hydrogen; or a group having the formula

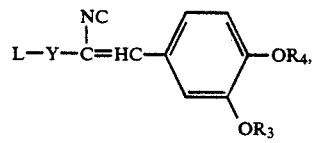

wherein Y is —CO$_2$—, —CON($R_5$)— where $R_5$ is as defined above, or —SO$_2$—, and L, $R_3$, and $R_4$ are as defined above;
provided that said ultraviolet light absorbing compound bears at least one substituent that is reactive with one of the monomers from which said polyester is derived; and
wherein said ultraviolet light absorbing compound is present in an amount sufficient to reduce the average percent transmission of ultraviolet light over the range of wavelength of from about 350 nm to about 395 nm to less than about 25 percent, and whereby the percent transmittance of said element is at least about 55 percent at a wavelength of about 410 nm for an element thickness of about 0.007 inches.

2. The radiographic image-recording element of claim 1, wherein:
X is —CO$_2R_6$ and $R_6$ is an alkyl group having from 1 to about 10 carbon atoms,
$R_1$ is hydrogen, an alkyl group having from 1 to about 10 carbon atoms, or a substituted alkyl group having from 1 to about 10 carbon atoms, and
$R_2$ is an alkyl group having from 1 to about 10 carbon atoms.

3. The radiographic image-recording element of claim 1, wherein:
X is —CO$_2R_6$ wherein $R_6$ is an alkyl group having from 1 to about 10 carbon atoms,
$R_2$ is an alkyl group having from 1 to about 10 carbon atoms, and
$R_1$ has the formula:

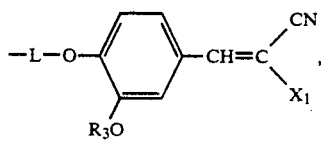

wherein $X_1$ is $-CO_2R_6$ and $R_6$ is as defined hereinabove, and $R_3$ is an alkyl group having from 1 to about 10 carbon atoms.

4. The radiographic image-recording element of claim 1, wherein:

$R_1$ is hydrogen, an alkyl group having from 1 to about 10 carbon atoms, or a substituted alkyl group having from 1 to about 10 carbon atoms, $R_2$ is an alkyl group having from 1 to about 10 carbon atoms, and X has the formula:

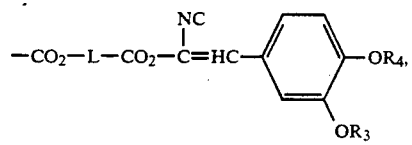

wherein $R_3$ is an alkyl group having from 1 to about 10 carbon atoms, and $R_4$ is hydrogen, an alkyl group having from 1 to about 10 carbon atoms, or a substituted alkyl group having from 1 to about 10 carbon atoms.

5. The radiographic image-recording element of claim 1, wherein said ultraviolet light absorbing compound is present in an amount sufficient to reduce the average percent transmission of ultraviolet light over the range of wavelength of from about 350 nm to about 395 nm to less than about 12 percent.

6. The radiographic image-recording element of claim 1, wherein the weight proportion of said ultraviolet light absorbing compound to said polyester is from about 200 to about 1600 parts per million.

7. The radiographic image-recording element of claim 1, wherein the weight proportion of said ultraviolet light absorbing compound to said polyester is from about 400 to about 800 parts per million.

* * * * *